Sept. 20, 1938.   W. H. SILVER   2,130,512
LISTER
Original Filed Oct. 8, 1934   4 Sheets-Sheet 2

INVENTOR
Walter H Silver
BY *Brown, Jackson, Boettcher & Dienner*
ATTORNEYS.

Patented Sept. 20, 1938

2,130,512

UNITED STATES PATENT OFFICE 2,130,512

LISTER

Walter H. Silver, Moline, Ill., assignor to Deere & Company, Moline, Ill., a corporation of Illinois Application October 8, 1934, Serial No. 747,261
Renewed March 26, 1937

47 Claims. (Cl. 97—47)

The present invention relates generally to agricultural implements, particularly to listers and other furrow opening types of implements, and one of the principal objects of the present invention is to provide an implement, such as a lister or similar machine, with a plurality of tools having independent gauge means, preferably gauge wheels, for each of the tool beams, so constructed and arranged that the lister bottoms or other tools may rise and fall independently of the tractor while being, at all times, accurately controlled as to depth of operation individually by the independent gauge means therefor.

Attempts have been made from time to time to secure accurate gauging of the depth of operation by means which is carried by or reacts against the tractor, whereby the gauging operation is actually determined by the position of the tractor, and it has also been attempted to secure satisfactory depth control by suitable ground engaging means which acts more or less independent of the position of the tractor or other source of power. This is, as is obvious, an advantage, and a lister of this latter type is disclosed and claimed in my copending application, Serial No. 646,845, filed December 12, 1932.

In order to obtain accurate gauging, it is desirable to have the gauge wheel or other ground engaging means as close to the lister bottoms or other ground working tools as is possible without interfering with the working of the soil or the movement thereof during operation. Also, in listers and similar implements, it is desirable to have the tool beams capable of a certain amount of lateral swinging movement so as to secure the best operation, and therefore in providing ground engaging means as close as possible to the ground working tools it is nevertheless necessary to arrange these parts so that the desired lateral swinging movement can be secured without any of the parts colliding with the rear wheels of the tractor. In order to secure this result, it has been proposed to dispose the tools and gauging means sufficiently to the rear of the tractor to permit of the desired lateral swinging movement, but in constructions of this sort when the implement is raised to its transport position, usually by means carried on the tractor, the latter is subjected to a heavy overhang, and, under certain conditions, this may cause the front end of the tractor to tend to tip up, particularly if going up hill.

Another object, therefore, of the present invention is to provide an implement in which the tools and the gauging means therefor are so disposed that the tractor is not subjected to a heavy overhang when the tools are raised to their transport position, but which, at the same time, is so constructed and arranged that sufficient lateral swinging movement of the tool beams is provided for without any danger of having the tools or other parts strike the rear wheels or other portions of the tractor. Specifically, in this connection, it is an object of the present invention to dispose the gauge wheels in between the soil working tools so that the ground engaging gauge means can be quite close to the tools without striking or otherwise causing interference with the wheels of the tractor. Thus, in an arrangement of this kind, maximum lateral swinging of the lister or other units is obtained.

A further object of the present invention is to provide a lister or other implement having ground engaging gauge means with suitable connections to prevent the unit from tilting laterally while, at the same time, providing for both vertical and lateral swinging of the unit as a whole about its point of draft connection with the tractor at the forward end of the tool beams.

A further object of the present invention in this connection is the provision of a pair of such units so constructed and arranged as to have separate and independent movement with respect to each other, with individual gauge means for each of said units and with both of the gauge means being disposed in a position generally centrally of the tractor and in between the two laterally spaced beams of the two separate units.

An additional object of the present invention is to provide a lister or similar implement with separate and independently movable units so connected with the tractor or other supporting means that each unit is held in substantially upright position but in which tilting of the tractor does not cause one of the units to operate appreciably deeper than the other, each unit being capable of rising and falling independently of the other unit.

Still further, another object of the present invention is, generically speaking, the provision of a lister having laterally spaced independently movable units with gauging means for the units disposed in a position substantially midway between the units so as to be in a position to operate in the furrow which the units straddle when the lister bottoms operate along the adjacent ridges. An advantage of this arrangement is that the gauging means positions the lister bottoms in their proper positions more or less independent of the accuracy of the previous ridge forming operations, an advantage which is not present in constructions employing gauging means operating, for example, along the outside furrows.

These and other objects and advantages of the present invention will be apparent to those skilled in the art after a consideration of the following detailed description of the preferred embodiment, taken in conjunction with the accompanying drawings.

In the drawings:

Figure 5 is a top plan view of a modified form of the present invention, embodying lister beams which are securely connected together to form a rigid lister frame;

Referring now to the drawings, particularly Figures 1 to 4, inclusive, the machine there shown comprises two similar lister units 3 and 4, and each unit consists of a forwardly extending beam 5 which is movably connected at its forward end to the tractor, preferably by being pivotally connected for both vertical and lateral swinging movement to a transverse draft bar 6 rigidly connected with the tractor. Each of the lister or tool beams 5 carries at its rear end an operating tool in the form of a lister bottom 7, the rear portion of each of the beams 5 being curved upwardly and then downwardly to receive the lister bottom 7 in the manner shown in Figure 2.

Figures 1, 4:
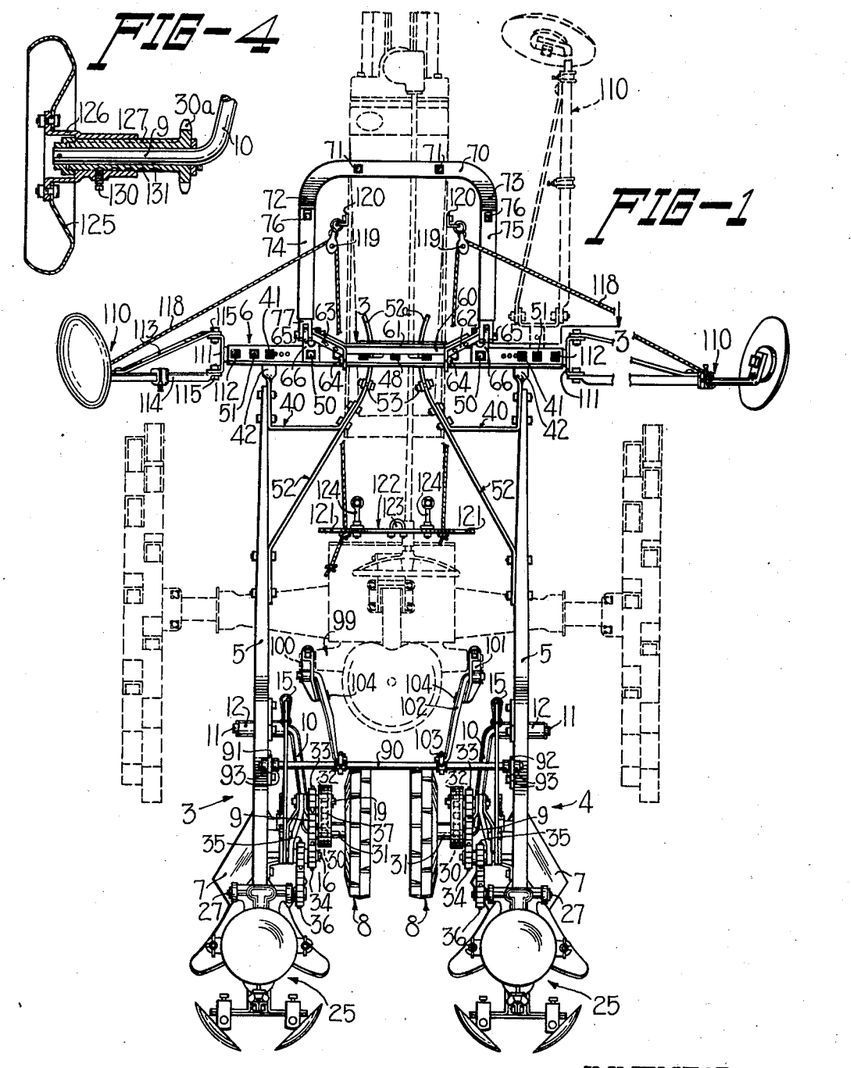
Figure 1 is a top plan view of a tractor supported lister illustrating the principles of the present invention, with the lister disclosed as an attachment and the tractor shown in dotted lines.
Figure 4 is a fragmentary section illustrating the construction of a laterally adjustable gauge wheel adapted to take the place of the gauge wheel shown in Figure 1.
Figure 2:
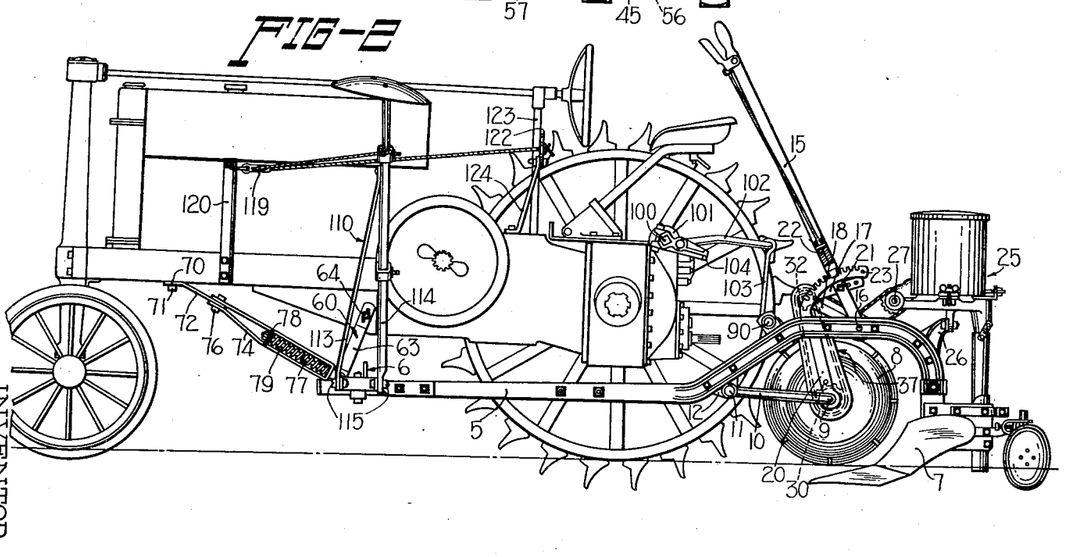
Figure 2 is a side view of the implement shown in Figure 1 with the near traction wheel removed.

The depth at which each lister bottom 7 operates is controlled by means of a gauge wheel 8 disposed on the inner side of the beam 5 and journaled on the crank end 9 of a crank axle 10, the axle portion 11 of which is rockably mounted in a bearing 12 fixed to the under side of the beam 5, as best shown in Figure 2. Each of the lister units is provided with a depth gauging means, and the gauge wheel 8 of each is disposed, as indicated in Figure 1, closely adjacent one another in the longitudinal central portion of the machine.

In each unit, the depth of operation of the tool is adjusted by means of a lever 15 which is pivotally mounted on a pin 16 (Figure 2) that extends laterally and inwardly from the beam 5. Two links 17 and 18 are connected together by a pin 19 (Figure 1), by which pin they are also connected to the upper end of a vertical link 20 (Figure 2). The links 17 and 18 are arranged in triangular formation, and the upper link 17 has its rear end connected to the lever 15, as by a bolt 21, and the rear end of the lower link 18 is connected to the pin 16 upon which the lever 15 is pivoted. These links 17 and 18 therefore form an arm which projects forwardly from the lever and which acts through the vertical link 20 to raise and lower the crank axle 10 relative to the beam 5, as will be apparent from Figure 2. The lever 15 is provided with conventional latch mechanism 22 cooperating with a sector 23 securely fixed to the beam 5. Each of the lister units is provided with such a depth adjusting means, as will be apparent from Figure 1, and a description of one of such means is therefore believed to be sufficient.

Each of the lister units carries seed selecting mechanism indicated in its entirety by the reference numeral 25. The seeding mechanism is mounted on a bracket 26 which is fixed to the rear end of the associated lister beam 5, and each seeding mechanism includes a seed selecting drive shaft 27 disposed generally transversely of the implement and operated by power derived from the gauge wheel 8 of that unit. The power transmitting means from the gauge wheel 8 to the drive shaft 27 includes a sprocket 30 fixed to the hub 31 of the gauge wheel 8, and this sprocket is connected by a sprocket chain to a second sprocket 32 (Figure 2) that is journaled on the pin 19. The sprocket 32 is secured to or formed integrally with another sprocket also journaled on the pin 19, the other sprocket being indicated by the reference numeral 33 in Figure 1. The sprocket 33 is connected by a sprocket chain with another sprocket 34 which is journaled on the pin 16. Like the sprocket 32, the sprocket 34 carries another sprocket, indicated by the reference numeral 35, and the latter sprocket is connected by a sprocket chain with a sprocket 36 fixed to the seed selecting drive shaft 27. The sprockets 30 and 32, and the chain connecting them, are enclosed in a suitable housing 37. By reason of such a driving connection, including the double sprockets journaled on the pins 16 and 19, the drive from the gauge wheel to the associated seed selecting mechanism is not in any way affected by the vertical movements of the gauge wheel relative to the beam 5 which supports the seed selecting mechanism. Thus, as illustrated, the gauge wheels have a double function, not only serving to determine the operating depth and providing for adjustment thereof through manipulation of lever 15, but in addition serving as ground engaging means for driving the seed selecting mechanism.

Figure 3:
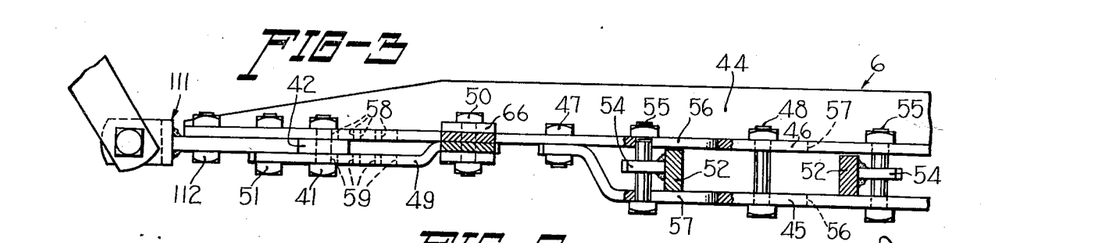
Figure 3 is an enlarged fragmentary section, taken along the line 3—3 of Figure 1, showing certain of the front end connections between the lister beams and the transverse draft bar.

Mention was made above of the fact that each of the lister beams is connected with a transverse draft bar 6 carried by the tractor. This connection is established for each of the two lister beams at laterally spaced points on the draft bar 6, as clearly shown in Figure 1. The forward end of each of the beams carries a bracket 40 which is of generally U-shaped formation having one end pivotally connected for lateral swinging movement with the draft bar 6 by means of a pivot bolt 41, this end of the bracket 40 being indicated in Figures 1 and 2 by the reference numeral 42. As best shown in Figure 3, the draft bar 6 comprises an angle member 44 having a U-shaped bracket or strap member 45 connected centrally thereof to the horizontal flange 46 of the angle 44 by end bolts 47 and a central bolt 48. The draft member 6, at each end, also carries a bracket 49 connected to the horizontal flange 46 by bolts 50 and 51. The end 42 of the lister beam bracket 40 is disposed between the bracket 49 and the flange 46 of the draft bar 6, as best shown in Figure 3, the bolt 41 serving to define the generally vertical pivot axis about which the lister beam 5 swings laterally with respect to the tractor.

Each lister unit is stabilized or held in an upright position against tilting laterally relative to the tractor by means of a laterally inwardly extending leveling bar 52 which is connected at its rear end to the beam 5 and, adjacent its forward end, to the laterally inner end of the bracket 40. The front end of the leveling bar 52 extends between the bracket 45 and the horizontal flange 46 of the draft bar 6, as best shown in Figure 3, and in order that the units shall be capable of swinging vertically as well as laterally, the draft bar 6 itself is connected with the tractor for movement about a transverse axis, as will be explained later. Also, the connections at 42 and 52 are loose enough to permit a limited amount of independent vertical motion of each of the units. The forwardmost portion of the leveling bar 52 is curved, as at 52a, this portion being formed so as to be arcuate about the pivot bolt 41 as a center, thus accommodating the lateral swinging movements of the beam 5 while, at the same time, maintaining the beam in an upright position and preventing the same from tilting laterally. As best shown in Figure 1, the curved portions 52a of the lister units lie in fore and aft lines which extend adjacent or through the position of the gauge wheels 8. The extent of lateral movement of either beam 5 may, if desired, be limited by any suitable means, such as clips 53 which are adapted to be bolted in various positions on the curved sections 52a of the leveling bar 52. Either one or two of these clips 53 may be provided, and if it is desired to lock the lister units against any lateral swinging with respect to the tractor, either such oppositely disposed clips 53, one on either side of the draft bar 6, may be used, or a perforated lug 54 may be welded or otherwise secured to the side of each bar 52 in a position to receive a bolt 55 (Figure 3) disposed in upper and lower slots 56 and 57 formed in the flange 46 and bracket 45.

In order that the spacing between the separate lister units may be adjusted, the draft bar 6 has been provided with a series of aligned holes 58 and 59 in the flange portion 46 thereof and in the bracket 49. The pivot bolt 41 may be disposed in any pair of these aligned openings for the purpose of adjusting the lateral spacing of the lister units 5, and the slots 56 and 57 accommodate any adjusted position of the bolt 55 corresponding to the desired position of the beam 5 relative to the draft bar 6.

The draft bar 6 is supported from the tractor by means of a supporting member 60 of generally vertically disposed U formation, as best indicated in Figure 1. This member comprises or takes the form of a bracket 61 riveted at its ends to a pair of arms 62 and 63, and the upper ends of these arms are pivotally connected by means of bolts 64 (Figure 2) to the sides of the tractor. The upper ends of the arms have a plurality of holes for receiving the bolts 64 and for adjusting the height of the bar 6 relative to the tractor, and the lower ends of the arms 62 and 63 are each pivotally connected by means of a pin 65 to a pair of bifurcated clips 66. These clips are U-shaped and embrace the horizontal flange 46 and the bracket 49, as best shown in Figure 3, and are secured thereto by the bolts 50 which, as previously mentioned, secure the inner ends of the bracket 49 to the bar 6. The draft bar 6 is further connected to the tractor by means of a yielding hitch device comprising a transverse U-shaped bar 70 which is bolted to the under side of the tractor by means of bolts 71. The ends 72 and 73 of the bar 70 are extended downwardly and rearwardly and are connected to a pair of downwardly and rearwardly extending U-shaped brackets 74 and 75 by any suitable means, such as bolts 76. The lower portion of each of said brackets 74 and 75 is perforated to receive a long bolt 77, as best shown in Figure 2, and the rear end of each of these bolts is provided with a bifurcated head (Figure 1) which is apertured to receive the pin 65 carried by the arm of the associated bracket 61 at that side of the tractor. In this way, and by the same pins 65, the draft bar 6 is connected with both the supporting member 60 and the transverse bar 70. A guide 78 is connected to the forward end of each bolt 77, and each guide is provided with lugs which embrace the sides of these brackets 74 and 75, as best shown in Figure 2. Between the guide 78 and the base portion of the associated bracket a heavy compression spring 79 is disposed, the latter embracing the bolt 77 and serving to oppose any rearward swinging movement of the supporting member 60.

The two lister units, which are separately and independently movable with respect to each other and with respect to the tractor, are held in relatively fixed spaced relation laterally by means of a transverse spacing bar 90, best shown in Figure 1. This bar extends loosely through perforations in brackets 91 and 92 secured, respectively, to the left-hand and right-hand lister units, preferably to the inner sides of the beams 5. The spacing bar 90 is provided with adjustable collars 93 adapted to be fixed thereto on opposite sides of the associated brackets. Whenever the lateral spacing of the beams 5 is adjusted by disposing the bolts 41 in a different set of transverse holes 58 and 59, a corresponding adjustment of the collars 93 is made. This connection thus provides, in effect, an adjustable pivotal connection between the spacing bar and the two units since, as stated, the bars extend loosely through the brackets 91 and 92 and therefore accommodate any relative vertical movement between the beams 5.

For raising and lowering the two separate lister units relative to the tractor, preferably the power take-off of the tractor is used. The power-lift on the tractor is indicated by the reference numeral 99 and may take any convenient form, such as a conventional half revolution rotatable clutch driven by gearing from the transmission of the tractor, or some of the newer forms of hydraulic power-lift mechanism may be utilized. The present invention is not concerned with the particular type of power-lift device, it being sufficient for the present purpose to note that the power-lift device 99 includes a rock shaft 100 adapted to be rocked about a generally transverse axis under the control of the operator. Suitable lifting connections between the beams 5 and the power-lift rock shaft 100 on the tractor are provided, and preferably these connections comprise an arm 101 bolted on each end of the rock shaft 100 and an arm 102 is pivoted to each of the arms 101, as best indicated in Figure 2. The outer ends of the latter arms are connected by means of links 103 with the transverse spacing bar 90, as best shown in Figure 1. In order to operate the arms 102 in one direction, the two arms 101, which are fixed to the ends of the rock shaft 100, are provided with inwardly extending lugs 104 (Figure 1) disposed below the arms 102 and rearwardly of the pivotal connection of the latter with the arms 101. These lugs are adapted to contact with the arms 102 whenever the rock shaft is rotated in a counter-clockwise direction, as viewed in Figure 2, and the continued rocking movement of the shaft 100 swings the arms 102 upwardly and raises the beams 5 to their transport position. The beams 5 are lowered to their operating position by rocking the shaft 100 in the other direction, and if, while in operating position, one of the lister units may be caused to take a position higher than the other unit, as by the gauge wheel of the first unit encountering a rise in the ground, this movement is accommodated by the above described connection between the arms 101 and 102.

Since the units 3 and 4 are provided with seed selecting mechanism, it is desirable to equip the implement with marking means in order to secure straight, even and parallel rows. To this end, therefore, a pair of markers 110 are provided, one on each side of the tractor, and in order to pivotally support these markers, I prefer to make use of the draft bar 6, as best shown in Figure 1. Preferably, the markers are pivotally supported on the outer ends of the draft bar 6 by any suitable means, such as brackets 111 connected to the outer ends of the draft bar 6 by means of bolts 112 and the bolts 51 referred to above, which latter bolts secure the laterally outer ends of the brackets or straps 49. Each of the marker arms comprises a pair of angularly related bars 113 and 114 pivotally connected at their inner ends, as by pivot bolts 115, to the fore and aft ends of the brackets 111. Thus, the markers 110 are capable of vertical swinging movement about generally longitudinally extending axes from an operating position to an inoperative position. For raising the markers, I provide cables 118 connected to the outer ends of the marker arms, and preferably the cables pass over pulleys 119 supported on vertical brackets 120 extending upwardly from the sides of the tractor, and from this point the cables 118 extend rearwardly, as best shown in Figure 1, and are adapted to be engaged in the forked ends 121 of a bracket 122 that is supported on a vertical steering wheel support 123 of the tractor adjacent the operator's seat. The bracket 122 is braced by a pair of bars 124.

One advantage of attaching both the forward ends of the tool means and the inner ends of the markers to the transversely disposed draft bar 6 lies in the fact that when the implement is to be detached from the tractor, the operation of detaching the transverse draft bar itself also serves to detach the forward ends of the beams and the inner ends of the markers. Therefore, in the illustrated embodiment, all the operator has to do in order to remove the lister from the tractor is to detach the brackets 60 and 70, the lifting connections, and the marker cables. To perform this operation, the operator disconnects the lifting connections by removing the arms 101 from the rock shaft 100, and then the bolts 64 and 71 are removed in order to disconnect the draft bar from the tractor. In order to disconnect the markers, the cables 118 may be disconnected from the marker arms, or the pulleys 119 may be removed and the ends of the cables 118 disconnected from the forked portions of the brackets 121. In either event, the next step is to remove the bolts 112 (Figure 1) and swing the marker arms forwardly, each into a position corresponding to that indicated in dotted lines in the upper right hand portion of Figure 1. Preferably, this is accomplished by swinging the marker arm brackets 111 forwardly about the bolts 51. This disposes the markers 110 in between the tread lines of the rear wheels of the tractor so that the tractor may be driven forwardly free of the lister without having the wheels run over any part of the implement.

As described above, the gauge wheel 8 and the driving sprocket 30, which is connected to the hub 31 of the wheel, are journaled for rotation on the crank end 9 of the crank axle 10 to position the gauge wheel 8 in definite laterally inwardly disposed position centrally of the tractor and in between the two lister beams 5. In some cases, however, it may be desirable, while providing gauge wheels in this general location, to arrange such a gauge means for adjustment laterally relative to the crank axle or axles on which such means is disposed. Figure 4 illustrates one manner in which adjustable gauge wheel means is provided, and in this figure the gauge wheel is indicated by the reference numeral 125 and is shown as fixed to a hub 126 which is disposed over a sleeve 127 that is journaled, in the same manner as the sleeve 31 described above, on the crank portion 9 of a crank axle 10. In this case, the gauge wheel 125 is held in any position of lateral adjustment on the sleeve 127 by means of a set screw 130 carried by the hub 126 and adapted to engage in any one of a series of depressions 131 formed in the sleeve 127. As will be apparent, of course, any other suitable form of adjusting means for securing the hub 126 in various positions on the sleeve 127 may be utilized. In Figure 4 the driving sprocket for actuating the seed selecting mechanism, and having the same function as the sprocket 30 described above, is indicated at 30a. Providing adjustable gauge wheels for the machine shown in Figure 1 has a number of advantages. Disposing the gauge wheels closely adjacent one another secures a relative uniform depth of operation for both units, and arranging the gauge wheels so as to be as close as possible to the lister bottoms provides an implement in which any lateral tilting of the tractor itself has very little effect on varying the depth of operation of the tools.

Figure 6:
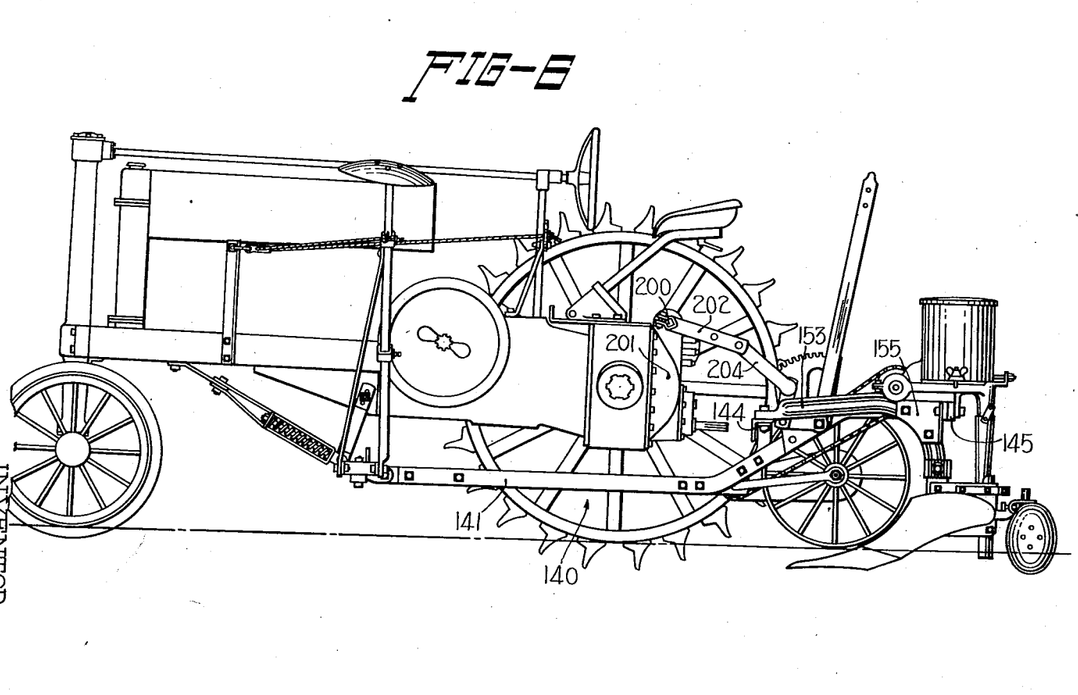
Figure 6 is a side view of the machine shown in Figure 5.
Figures 7, 9:
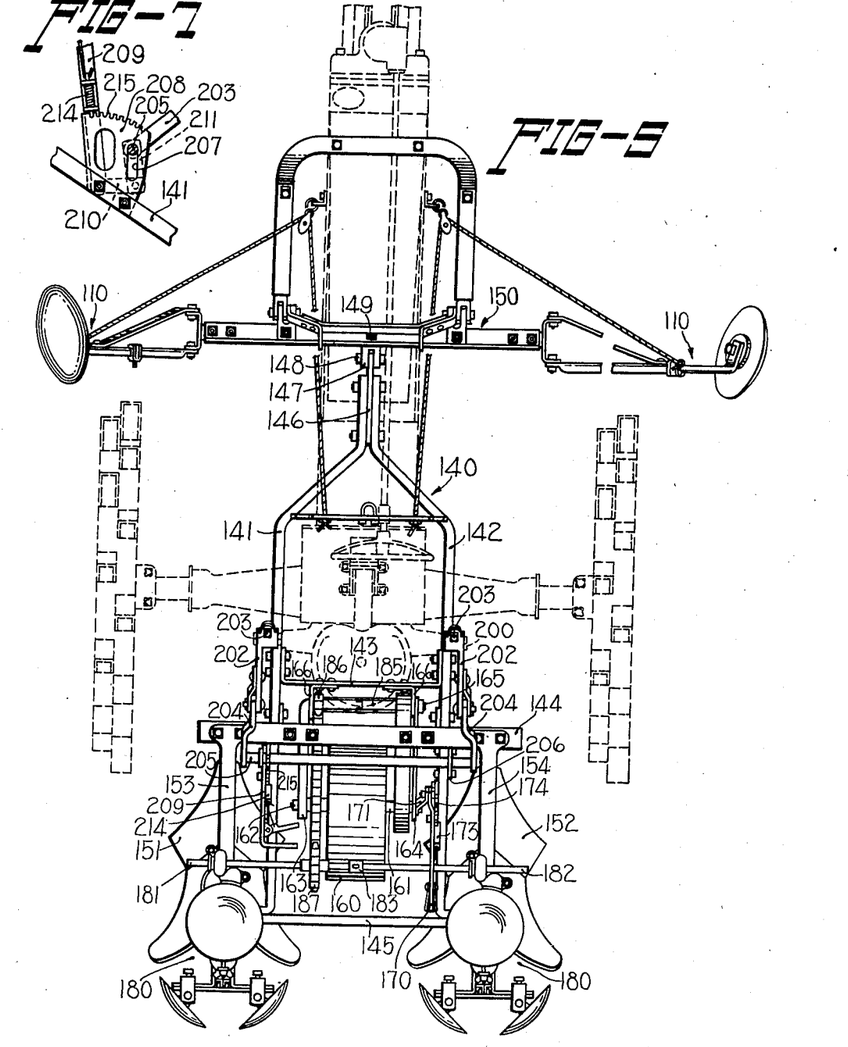
Figure 7 is a fragmentary view illustrating the leveling adjustment for the construction shown in Figure 5.

Figures 5, 6 and 7 illustrate a modified form of lister in which certain of the principles of the present invention have been embodied. Referring now more particularly to Figure 5, the lister illustrated comprises a frame 140 made up of two laterally spaced generally longitudinally disposed frame or beam members 141 and 142 which converge forwardly and are connected together at their rear ends by three transverse members 143, 144 and 145, the latter member being secured to the laterally outwardly bent rear ends of the frame members 141 and 142. At the forwardly converging portions of the latter members, a bar 146 is bolted, being disposed in between the forwardmost portions of the frame members 141 and 142. The bar or plate member 146 is pivotally connected to a hitch member 147 by means of a transverse pivot bolt 148 which provides for the vertical swinging movement of the frame 140. The hitch member 147 is, in turn, connected by a vertical pivot bolt 149 to a transverse draft bar 150. Preferably, but not necessarily, this draft bar is identical in construction to the draft bar 6 described above, being equipped with pivoted markers 110 and being secured to the tractor in detachable relationship, all as described above.

The lister frame 140 carries two laterally spaced lister bottoms 151 and 152 which are supported from the rear of the frame by means of two stub beams 153 and 154, the latter being connected to the frame by means of plates 155 which extend forwardly from the ends of the rear transverse member 145. The forwardmost ends of the stub beams 153 and 154 are bolted to the laterally outer end portions of the intermediate transverse frame bar 144, as best shown in Figure 5. So far as the frame construction of the above described lister is concerned, the frame includes the principal features of one of the constructions disclosed and claimed in my copending application, Serial No. 646,845, filed December 12, 1932.

The depth at which the lister bottoms 151 and 152 operate is controlled by a single gauge wheel 160 which is disposed substantially centrally of the tractor and between the two bottoms 151 and 152, and is fixed to a sleeve 161 which is journaled upon a transverse shaft 162. The shaft 162 is supported between the two arms 163 and 164 which extend rearwardly from and are preferably fixed to a rock shaft 165. Preferably, although not necessarily, the arm 163 is formed integral with the rock shaft 165, while the other arm 164 is detachably associated therewith. The rock shaft 165 is mounted for rocking movement in a pair of brackets 166 suitably fixed, as by bolts or rivets, to the forward transverse member 143, and the position of the central gauge wheel 160 relative to the lister bottoms is controlled by means of a depth adjusting lever 170 which is pivoted to the inner side of the right hand frame member 142 and is connected by means of a link 171 with one end of the gauge wheel shaft 162. The lever 170 is provided with latch mechanism 173 which cooperates with a sector 174 fixed to the frame member 142 for holding the gauge wheel 160 in any desired position.

Each of the lister bottoms 151 and 152 is provided with a seed selecting mechanism 180 disposed as indicated in Figure 5 and driven by means of transverse interconnected drive shafts 181 and 182, being connected together at their inner ends by means of a coupling 183 so as to function as a single transversely disposed seed selecting drive shaft. The shaft sections 181 and 182 are driven by power derived from the single gauge wheel 160, and the driving connection includes a sprocket fixed on the sleeve 161 and a chain which extends therefrom to another sprocket fixed on a sleeve 185 journaled for rotation on the rock shaft 165. This sleeve, which is in two interconnected sections, carries a sprocket 186 at the other end of the last mentioned sprocket, and the sprocket 186 is chain-connected to a sprocket 187 fixed on the shaft section 181, whereby rotation of the gauge wheel 160 serves to drive the shafts 181 and 182.

The lister is held level with respect to the tractor by means of a rock shaft on the tractor and suitable laterally spaced arms and links connected between the rock shaft and the lister frame. Preferably, although not necessarily, the rock shaft of the power-lift of the tractor is utilized, and such is the construction that I have illustrated in Figure 5. In this figure, the power-lift rock shaft is indicated by the reference numeral 200 and is actuated by any suitable form of mechanism, the power-lift device being indicated in Figure 6 by the reference numeral 201, and may be of any suitable construction, the present invention not being concerned with the particular details of the tractor power-lift. The rock shaft 200 carries at its ends a pair of arms 202 which are fixedly connected, as by bolts 203, with the rock shaft. The ends of the arms 202 are pivotally connected to a pair of arms 204 which are fixedly connected to or form a part of a transverse rock shaft 205 that extends at its right end through a perforation in a bracket 206 fixedly secured to the right-hand frame member 142.

The other end of the transverse rock shaft 205 is adjustably connected with the left-hand frame member 141, as best shown in Figure 7. This end of the rock shaft 205 extends through a vertically disposed slot 207 formed in a bracket 208 which is fixed to the frame member 141 so as to be capable of being raised or lowered relative to the left-hand frame member 141. A leveling lever 209 is pivotally connected to the side of the frame member 141 and is provided with a forwardly extending arm 210 that is either formed integrally with the lever 209 or rigidly secured thereto, as desired. The forwardmost end of this arm is connected by means of a link 207 with the rock shaft 205 so that the position of the lever 209 acts through the arm 210 and the link 211 to govern the position of the rock shaft in the slot 207 of the bracket 208 while accommodating any rocking movement of the rock shaft 205. The lever 209 carries latch mechanism 214 which cooperates with notches 215 formed on the bracket 208, which thus serves as a sector for the leveling lever 209.

By virtue of the construction thus described, the lister frame 140 is prevented from tilting laterally relatively to the tractor, but lateral and vertical swinging movement is permitted and, at the same time, the implement may be raised and lowered through the proper actuation of the lifting rock shaft 200. When the tractor power-lift mechanism 201 is of the type in which the rock shaft 200 is locked against rotation in either direction when the tools are in their lowered position, some form of collapsible connection, such as is disclosed in my copending application identified above, should be provided instead of the interconnected arms 202 and 204 described above. However, when the power-lift mechanism 201 is of the type in which the rock shaft 200 is free to rock in either direction when the tools are in their lowered position, the construction illustrated is preferably employed. As stated, the present invention is not concerned with the details per se of the power-lift, but reference is here made to the co-pending application, Serial No. 749,706, filed October 24, 1934, by Elmer McCormick, Milford D. Stewart and Wayne H. Worthington, as disclosing a power-lift mechanism of the latter type, which is the type indicated in the drawings.

While I have described above the preferred structure in which the principles of the present invention have been embodied, it is to be understood that my invention is not to be limited to the details shown and described, but that, in fact, widely different means may be employed in the practice of the broader aspects of my invention.

What I claim, therefore, and desire to secure by Letters Patent is:

1. The combination with a tractor, of an implement comprising a pair of laterally spaced beams, ground working tool means supported adjacent the rear portion of each beam and adapted for simultaneous operation, means connecting the front portion of said beams with the tractor whereby said beams may swing laterally and may rise and fall relative to the tractor, gauge means disposed between said tool means substantially centrally of the tractor for gauging the depth of operation of said tool means, and means for causing said tool means and associated beams to take parallel positions with respect to each other when both tool means are in operation and to tilt angularly laterally with the tractor while retaining their parallel positions.

2. The combination with a tractor, of an implement comprising a pair of laterally spaced beams, ground working tool means supported adjacent the rear portion of each beam, means connecting the front portion of said beams with the tractor whereby said beams may swing laterally and may rise and fall relative to the tractor, means cooperating with said connecting means for causing both of said beams and associated tool means to tilt angularly laterally with the tractor so that the vertical planes of said beams remain parallel with respect to each other and with respect to the vertical longitudinal plane of the tractor, gauge means disposed between said tool means substantially centrally of the tractor for gauging the depth of operation of said tool means, and means connecting said beams with the tractor for raising both of said beams simultaneously.

3. The combination with a tractor, of a lister adapted to plow a pair of parallel furrows simultaneously and comprising a pair of laterally spaced beams adapted to be raised and lowered simultaneously about a transverse horizontal axis, a ground working tool supported on the rear portion of each beam, means connecting the front portion of said beams with the tractor whereby said beams may swing laterally and may rise and fall relative to the tractor, gauge means disposed between said tools for gauging the depth of operation of said tools, and means connecting said beams with the tractor for maintaining said tools in an upright position with respect to the tractor when both of said beams and associated ground working tools are in operating position and as the tractor tilts from side to side.

4. The combination with a tractor, of an implement comprising a pair of laterally spaced beams, a ground working tool supported on the rear portion of each beam, said tools having forwardly projecting points in transverse alignment when both of the tools are in operating position, means connecting said beams with the tractor and constraining said beams to swing laterally about substantially parallel vertical axes and to swing vertically relative to the tractor about a common transverse axis, whereby said tools are maintained in an upright position relative to the tractor when both of said beams are lowered into operating position, and gauge means disposed between said tools and substantially in transverse alignment with the points thereof for gauging the depth of operation of said tools.

5. The combination with a tractor having spaced rear wheels, of an implement comprising a pair of laterally spaced beams disposed between said rear wheels, a ground working tool supported on the rear portion of each of said beams, a transverse draft bar carried by the tractor forward of said rear wheels and extending laterally at opposite sides of the tractor, means connecting the front portions of said beams with said draft bar, detachable means securing said draft bar to the tractor, laterally extending marker means pivotally connected, respectively, with the laterally outer ends of said draft bar, and means providing for swinging the marker means from their laterally extended position into a forwardly extended position substantially in line with said tools and between the tread lines of said wheels, to provide for driving the tractor forwardly away from said implement when the latter is detached from the tractor.

6. The combination with a tractor, of an implement comprising a pair of laterally spaced beams, a ground working tool supported on the rear portion of each beam, means connecting the front portion of said beams with the tractor whereby said beams may rise and fall relative to the tractor independently of each other, means connecting the rear ends of said beams for causing them to swing together laterally of the tractor, gauge means operatively connected with each of said beams and disposed therebetween for gauging the depth of operation of said tools when both are in operating position, and means connecting said beams with the tractor for maintaining said tools in an upright position with respect to the tractor in all positions of the tools and irrespective of the position of either tool with respect to the other.

7. The combination with a tractor, of a two-row lister comprising two lister units disposed on opposite sides of the tractor body and both adapted to be lowered into operating position simultaneously, each unit comprising a longitudinally extending beam having a lister bottom fixed to the rear end thereof, a gauge wheel for each unit disposed adjacent the lister bottom and on the inner side of the beam, means connecting the forward end of each beam to the tractor whereby the units may rise and fall independently of one another about substantially the same transverse axis and may swing laterally about laterally spaced points, and means for maintaining each unit substantially upright relative to the tractor so that when the tractor tilts with both units in operating position the planes of said lister bottoms are substantially parallel.

8. The combination with a tractor, of a two-row lister comprising two lister units disposed on opposite sides of the tractor body, each unit comprising a longitudinally extending beam having a lister bottom fixed to the rear end thereof, a gauge wheel for each unit disposed adjacent the lister bottom and on the inner side of the beam, means connecting the forward end of each beam to the tractor whereby the units may rise and fall independently and may swing laterally about laterally spaced points, means for maintaining each unit in an upright position relative to the tractor, and a spacing bar pivotally connected at opposite ends to said units to cause said units to swing laterally in unison meanwhile permitting said units to rise and fall independently.

9. The combination with a tractor, of a two-row lister comprising two lister units disposed on opposite sides of the tractor body, each unit comprising a longitudinally extending beam having a lister bottom fixed to the rear end thereof, a gauge wheel for each unit disposed adjacent the lister bottom and on the inner side of the beam, means connecting the forward end of each beam to the tractor whereby the units may rise and fall independently and may swing laterally about laterally spaced points, means for maintaining each unit in an upright position relative to the tractor, a spacing bar pivotally connected at opposite ends to said units to cause said units to swing laterally in unison meanwhile permitting said units to rise and fall independently, and means on the tractor connected with said spacing bar for raising said units to inoperative position.

10. The combination with a tractor, of a two-row lister comprising two lister units disposed on opposite sides of the tractor body, each unit comprising a longitudinally extending beam having a lister bottom fixed to the rear end thereof, a gauge wheel for each unit disposed adjacent the lister bottom and on the inner side of the beam, means connecting the forward end of each beam to the tractor whereby the units may rise and fall independently and may swing laterally, and means for maintaining each unit in an upright position comprising means serving as a laterally disposed bracket rigidly connected with each of said means and movably connected with the tractor so as to accommodate lateral swinging movement of the beams while preventing any angular movement of said beams relative to the tractor about a generally longitudinal axis.

11. The combination with a tractor, of a two-row lister comprising two lister units disposed on opposite sides of the tractor body, each unit comprising a longitudinally extending beam having a lister bottom fixed to the rear end thereof, a gauge wheel for each unit disposed adjacent the lister bottom and on the inner side of the beam, means connecting the forward end of each beam to the tractor whereby the units may rise and fall independently and may swing laterally, said means comprising a transversely disposed drawbar supported on the tractor to which said beams are pivotally connected at laterally spaced points, and means for maintaining each unit in an upright position comprising a bracket fixing said drawbar in spaced relation thereto and a leveling bar fixed to the beam and extending laterally therefrom and into the space between said bracket and said drawbar.

12. The combination with a tractor, of a two-row lister comprising two lister units disposed on opposite sides of the tractor body, each unit comprising a longitudinally extending beam having a lister bottom fixed to the rear end thereof, a gauge wheel for each unit disposed adjacent the lister bottom and on the inner side of the beam, means connecting the forward end of each beam to the tractor whereby the units may rise and fall independently and may swing laterally, said means including parts defining a vertical pivot axis for the front end of each of said beams, and means for maintaining each unit in an upright position with respect to the tractor and including laterally inwardly disposed bracket means associated with each of said beams and having sections curved about the pivot axis of the associated beam and reacting against the tractor for holding the beams in their upright position.

13. The combination with a tractor, of a two-row lister comprising two lister units disposed on opposite sides of the tractor body, each unit comprising a longitudinally extending beam having a lister bottom fixed to the rear end thereof, means pivotally connecting the forward ends of said beams with the tractor at laterally spaced points defining substantially vertical pivot axes for the beams, a gauge wheel connected to and disposed laterally inwardly of the rear portion of each of said beams, and means for preventing said beams from tilting laterally with respect to the tractor, said means comprising a laterally extending bracket connected with the forward end of each of said beams and carrying means at its forward end disposed adjacent the tractor laterally of the pivot axis of the associated beam and reacting against the tractor to prevent the associated beam from tilting laterally.

14. The combination with a tractor, of a two-row lister comprising two lister units disposed on opposite sides of the tractor body, each unit comprising a longitudinally extending beam having a lister bottom fixed to the rear end thereof, a gauge wheel for each unit disposed adjacent the lister bottom and on the inner side of the beam, means connecting the forward end of each beam to the tractor whereby the units may rise and fall independently and may swing laterally about laterally spaced points, means for maintaining each unit in an upright position relative to the tractor, and means associated with the last mentioned means for locking the unit against lateral swinging.

15. The combination with a tractor, of a two-row lister comprising two lister units disposed on opposite sides of the tractor body, each unit comprising a longitudinally extending beam having a lister bottom fixed to the rear end thereof, a gauge wheel for each unit disposed adjacent the lister bottom and on the inner side of the beam, means connecting the forward end of each beam to the tractor whereby the units may rise and fall independently and may swing laterally, said means comprising a transversely disposed drawbar supported on the tractor to which said beams are pivotally connected at laterally spaced points, means for maintaining each unit in an upright position comprising a bracket fixing said drawbar in spaced relation thereto and a leveling bar fixed to the beam and extending laterally therefrom and into the space between said bracket and said draw-bar, and means for locking said leveling bar to said drawbar to lock the unit against lateral swinging.

16. The combination with a tractor, of a two-row lister comprising two lister units disposed on opposite sides of the tractor body, each unit comprising a longitudinally extending beam having a lister bottom fixed to the rear end thereof, a gauge wheel for each unit disposed adjacent the lister bottom and on the inner side of the beam, means connecting the forward end of each beam to the tractor whereby the units may rise and fall independently and may swing laterally about laterally spaced points, means for maintaining each unit in an upright position relative to the tractor, said means comprising a laterally inwardly extending bracket carried by the beam of each unit, means serving as a pair of vertically spaced plate members rigidly secured to the tractor in vertically spaced relation, and a member rigidly carried by the bracket and disposed between said vertically spaced plate members and serving to keep the unit from tilting laterally with respect to the tractor.

17. The combination with a tractor, of an implement comprising a frame, two laterally spaced ground working tools supported on the rear portion of said frame and having forwardly projecting points in transverse alignment, means pivotally connecting the front portion of the frame to the tractor for vertical movement with respect to the tractor, gauge means disposed between said tools and substantially in transverse alignment with said points for gauging the depth of operation of said tools, and means connected between the tractor and said frame for maintaining said frame in a level position with respect to the tractor in all vertical positions of the frame.

18. An agricultural implement comprising a wheeled supporting frame, a tool frame associated therewith and including a pair of generally longitudinally extending beam members and a transverse member connected therewith and extending laterally outwardly thereof, a pair of stub beams having their forward ends secured to the laterally outer portions of said transverse member, a second transverse member connecting said longitudinal beam members and spaced from said first transverse member, a gauge wheel disposed between and in substantially transverse alignment with said stub beams, and means adjustably fixing the position of said gauge wheel relative to said beams for determining the depth of operation of the tools carried thereby.

19. The combination with a tractor, of a planting implement comprising a hitch device detachably connected with the tractor, planting mechanism including a ground working tool beam structure extending generally longitudinally of the tractor and connected at its forward end with said hitch device, and a marker pivotally supported on said hitch device and movable into an operating position spaced laterally of said ground working tool beam.

20. The combination with a tractor, of a planting implement comprising a hitch device detachably connected with the tractor, planting mechanism including a ground working tool beam structure extending generally longitudinally of the tractor and connected at its forward end with said hitch device, marker means pivotally connected to one end of said hitch device for vertical swinging movement and including a ground engaging element spaced laterally of said tool beam when in operating position, and means on the tractor adjacent said hitch device and connected with said marker means for raising and lowering the latter.

21. The combination with a tractor, of an implement comprising a hitch device detachably connected with the tractor, a ground working tool beam structure extending generally longitudinally of the tractor and pivotally connected at its front end to said device for vertical swinging with respect to the tractor, a marker support connected with said implement adjacent the point of pivotal connection of said beam structure with said hitch device, and marker means pivotally connected with said support and adapted to extend laterally outwardly thereof.

22. The combination with a tractor, of an implement comprising a hitch device detachably connected with the tractor, a ground working tool beam structure extending generally longitudinally of the tractor and pivotally connected at its front end to said device for vertical swinging with respect to the tractor, a marker support connected with said implement adjacent the point of pivotal connection of said beam structure with said hitch device, a marker arm pivotally connected with said support for vertical swinging, and means on the tractor connected with said marker arm for raising and lowering the latter.

23. The combination with a tractor, of an implement comprising a hitch device detachably connected with the tractor, a ground working tool beam structure extending generally longitudinally of the tractor and pivotally connected at its front end to said device for vertical swinging with respect to the tractor, a marker support connected with said implement adjacent the point of pivotal connection of said beam structure with said hitch device, a marker arm pivotally connected with said support for vertical swinging, and means operatively connected to react against the tractor at a point spaced forwardly of said hitch device for raising and lowering the marker arm.

24. The combination with a tractor, of an implement comprising a beam structure extending generally longitudinally of the tractor and pivotally connected therewith at its forward end for vertical swinging with respect to the tractor and adapted to have a ground working tool attached to its rear end, a marker support connected with the forward end of said beam structure, a marker arm pivotally connected with said support for vertical swinging, and means on the tractor connected with said marker arm for raising and lowering said marker arm.

25. The combination with a tractor, of an implement comprising a detachable beam structure extending generally longitudinally of the tractor and pivotally connected therewith at its forward end for vertical swinging with respect to the tractor and adapted to have a ground working tool attached to its rear end, a marker support connected with the forward end of said beam structure and detachable from the tractor with said beam structure, and marker means carried by said support.

26. The combination with a tractor, of an implement comprising a hitch device supported on the tractor, a ground working tool beam extending longitudinally of the tractor and pivotally connected at its forward end to said hitch device for swinging with respect to the tractor, a marker support connected to said hitch device, a marker arm pivotally connected to said support for vertical swinging, and means on the tractor connected with said marker arm for raising and lowering the latter.

27. The combination with a tractor, of an implement comprising a transverse member pivotally connected with the tractor for vertical swinging movement about a generally transverse axis, a ground working tool beam structure extending generally longitudinally of the tractor and pivotally connected with said transverse member for lateral swinging movement, and marker means pivotally connected to said transverse member for generally vertical swinging movement.

28. The combination with a tractor, of an implement comprising a transverse draft member operatively supported from the tractor for generally vertical swinging movement about a transverse axis, a pair of laterally spaced ground working tool beams extending generally longitudinally of the tractor and pivotally connected at their forward ends with said transverse draft member for lateral swinging movement, a marker support carried at each end of said transverse draft member, and marker means carried by each of said supports for vertical swinging movement.

29. The combination with a tractor, of an implement comprising a pair of laterally spaced beams, ground working tool means supported adjacent the rear portion of each beam and adapted for simultaneous operation, means connecting the front portion of said beams with the tractor whereby said beams may rise and fall relative to the tractor in planes substantially parallel to the longitudinal vertical plane of the tractor, gauge means disposed between said tool means substantially centrally of the tractor for gauging the depth of operation of said tool means, and means for causing said tool means and associated beams to take parallel positions, with respect to each other when both tool means are in operation and to tilt angularly laterally with the tractor while retaining their parallel positions.

30. The combination with a tractor, of an implement comprising a pair of laterally spaced beams, ground working tool means supported adjacent the rear portion of each beam, means connecting the front portion of said beams with the tractor so that both of said tool means are adapted for simultaneous operation and may rise and fall relative to the tractor independently of each other during their simultaneous operation, means cooperating with said connecting means for causing both of said beams and associated tool means to tilt angularly laterally with the tractor so that the vertical planes of said beams remain parallel with respect to each other and with respect to the vertical longitudinal plane of the tractor while the tool means shift vertically relative to each other to maintain approximately equal depth of operation, gauge means disposed between said tool means substantially centrally of the tractor for gauging the depth of operation of said tool means, and means connecting said beams with the tractor for raising both of said beams simultaneously.

31. The combination with a tractor, of a lister comprising a pair of laterally spaced beams, a ground working tool supported on the rear portion of each beam comprising a lister bottom adapted to turn furrows in opposite directions, said tools having forwardly projecting points in transverse alignment when both of the tools are in operating position, means connecting said beams with the tractor and constraining said beams to swing vertically relative to one another and to the tractor about a common transverse axis, whereby said tools are maintained in an upright position relative to the tractor when both of said beams are lowered into operating position and said tractor tilts laterally, and gauge means disposed between said tools substantially in transverse alignment with the points thereof for gauging the depth of operation of said tools and spaced laterally inwardly from the latter so as to be out of the way of the soil turned laterally inwardly by said lister bottoms.

32. The combination with a tractor, of an implement comprising a yielding hitch device detachably connected with the tractor, a ground working tool beam structure extending generally longitudinally of the tractor and pivotally connected at its front end to said device for vertical swinging with respect to the tractor, laterally extending markers, and means connecting the latter to said beam structure so that the markers move longitudinally and swing vertically with said beam structure.

33. The combination with a tractor, of an implement comprising a beam structure extending generally longitudinally of the tractor and pivotally connected therewith at its forward end for vertical swinging with respect to the tractor and adapted to have a ground working tool attached to its rear end, marker supporting means connected with the forward end of said beam structure, a marker arm pivotally connected with said support for vertical swinging, and means on the tractor connected with said marker arm for raising and lowering said marker arm.

34. The combination with a tractor, of an implement comprising a hitch device detachably connected with the tractor, a ground working tool beam structure extending generally longitudinally of the tractor and pivotally connected at its front end to said device for vertical swinging with respect to the tractor, marker supporting means connected with said implement adjacent the point of pivotal connection of said beam structure with said hitch device, and marker means pivotally connected with said supporting means and adapted to extend laterally outwardly thereof.

35. The combination with a tractor, of an implement comprising a hitch device detachably connected with the tractor, a ground working tool beam structure extending generally longitudinally of the tractor and pivotally connected at its front end to said device for vertical swinging with respect to the tractor, marker supporting means connected to said beam structure adjacent the point of pivotal connection of the latter with said hitch device, and marker means pivotally connected with said supporting means and adapted to extend laterally outwardly thereof.

36. The combination with a tractor, of a lister comprising a pair of laterally spaced beams, ground working tool means comprising a lister bottom supported on each of said beams, means supporting said beams and providing for the simultaneous operation of said tool means to form parallel furrows by throwing the soil in both directions as the implement moves forwardly, means connecting the front ends of said beams to the tractor providing for independent vertical swinging movement of each of said beams relative to the tractor, and individual gauge means for each of said tool means disposed to engage the ground between said tool means and laterally inwardly of the soil turned inwardly by said lister bottoms for gauging the depth of operation thereof.

37. The combination with a tractor, of an implement comprising a pair of laterally spaced beams, ground working tool means supported on each of said beams and adapted for simultaneous operation to form parallel furrows as the implement moves forwardly, means connecting the front ends of said beams to the tractor providing for independent vertical swinging movement of each of said beams relative to the tractor, and an individual ground engaging gauge wheel connected to each of said tool beams, disposed adjacent to each other substantially on the center line of said tractor, whereby lateral tilting of the tractor with both tool means in operation has a minimum effect on the relative depths of operation of said tool means.

38. The combination with a tractor, of an implement comprising a pair of laterally spaced units including ground working tools, one at each side of the tractor, means connecting said units with the tractor for both lateral and vertical swinging movement relative to the tractor, gauge wheel means for said units disposed adjacent the forward portions of said tools, and stabilizing means extending between said units for maintaining the latter in parallelism.

39. The combination with a tractor, of an implement comprising a draft bar adapted to be fastened to the tractor adjacent the forward end thereof, a pair of laterally spaced ground working units one at each side of the tractor body, means connecting said units with the draft bar for independent movement relative to one another in at least one direction, said units being connected with said draft bar for both lateral and vertical movement relative to the tractor, stabilizing means extending between said units for maintaining the latter substantially in parallelism during their movements relative to each other and to the tractor, and means reacting against the tractor for holding said units against lateral tilting.

40. The combination with a tractor, of a two-row lister comprising two lister units disposed on opposite sides of the tractor body, each unit comprising a longitudinally extending beam having a lister bottom fixed to the rear end thereof, a gauge wheel for each unit disposed adjacent the lister bottom and on the inner side of the beam, means connecting the forward end of each beam to the tractor whereby the units may rise and fall independently, means for maintaining each unit in an upright position relative to the tractor, a spacing bar connected at opposite ends to said units to accommodate the independent vertical movement of the beams, and lifting means carried by the tractor and connected to said spacing bar for raising and lowering both of the lister units.

41. The combination with a tractor, of a planting implement comprising a tran verse draft member connected with said tractor adjacent the forward end thereof, two laterally spaced lister units disposed on opposite sides of the tractor body, each unit comprising a generally longitudinally extending beam having a lister bottom and a planting device fixed to the rear end thereof rearwardly of the rear wheels of the tractor and its forward end pivotally connected with said draft member intermediate the ends of the latter, a marker pivotally connected with each end of said transverse draft member laterally outwardly of the pivotal connection of the beam and forward of the rear wheel at the side of the tractor, and means adjacent the rear of the tractor for raising said uits.

42. The combination with a tractor, of a planting implement comprising a transverse draft member connected with said tractor adjacent the forward end thereof, two laterally spaced lister units disposed adjacent opposite sides of the tractor body, each unit comprising a generally longitudinally extending beam having a lister bottom and a planting device fixed to the rear end thereof rearwardly of the rear wheels of the tractor and its forward end pivotally connected with said draft member, a marker pivotally connected with each end of said transverse draft member, means adjacent the rear of the tractor for raising said units, and means also adjacent the rear of the tractor for raising said markers.

43. The combination with a tractor, of a planting implement comprising a transverse draft member connected with said tractor adjacent the forward end thereof, two laterally spaced lister units disposed on opposite sides of the tractor body, each unit comprising a generally longitudinally extending beam having a lister bottom and a planting device fixed to the rear end thereof rearwardly of the rear wheels of the tractor and its forward end pivotally connected with said draft member intermediate the ends of the latter, a gauge wheel for each unit disposed adjacent the lister bottom thereof and disposed on the inner side of said beam, means for maintaining these units in an upright position comprising a laterally inwardly disposed bracket associated with each of said beams and having a section reacting against said draft member laterally inwardly of the pivotal connection therewith of the associated beam, and a marker pivotally connected with each end of said transverse draft member laterally outwardly of the aforesaid brackets and the pivot connection of the associated beam with said draft member.

44. The combination with a tractor, of an implement comprising a transverse draft member pivotally connected with the tractor for generally fore and aft movement, a ground working tool beam structure extending generally longitudinally of the tractor and pivotally connected with said transverse member for lateral swinging movement and having laterally spaced tools, generally centrally disposed gauge wheel means between said tools, means reacting against the tractor for holding said beam structure against lateral tilting while accommodating movement of said draft member, marker means pivotally connected to said transverse draft member for generally vertical swinging movement, and means also reacting against the tractor and accommodating movement of said draft member for raising said marker means.

45. A tractor lister comprising a tool beam structure adapted to be connected to the tractor for both lateral and vertical swinging movement, laterally spaced tools carried by said beam structure and adapted for simultaneous operation, centrally disposed gauge means connected to said beam structure substantially between said tools, and means reacting against the tractor and said beam structure for holding both of said tools in operation in planes parallel to the horizontal plane of the tractor.

46. The combination with a tractor, of a lister comprising a pair of laterally spaced beams, ground working tool means comprising a lister bottom supported on each of said beams, means supporting said beams and providing for the simultaneous operation of said tool means to form parallel furrows by throwing the soil in both directions as the implement moves forwardly, means connecting the front ends of said beams to the tractor providing for independent vertical swinging movement of each of said beams relative to the tractor, and individual gauge means for each of said tool means disposed in a position substantially midway between the tool means and spaced to operate in the furrow which the lister straddles during relisting when the lister bottoms operate along the adjacent previously formed ridges.

47. The combination with a tractor, of a lister comprising a pair of laterally spaced, ground working tool units, including lister bottoms and means supporting said bottoms and providing for the simultaneous operation of said lister bottoms to form parallel furrows by throwing the soil in both directions as the implement moves forwardly, means connecting said units to the tractor providing for independent vertical movement of each of said units relative to the tractor, and individual gauge means for each of said tool units disposed in a position substantially midway between the tool means and spaced to operate in the furrow which the units straddle during relisting when the lister bottoms operate along the adjacent previously formed ridges, whereby said gauging means positions the lister bottoms in their proper positions for relisting, substantially independent of the accuracy of the previous ridge forming operations.

WALTER H. SILVER.